(12) United States Patent
Ziemer (10) Patent No.: US 10,279,672 B2
(45) Date of Patent: May 7, 2019

(54) GEARBOX HAVING AN ELECTRIC MOTOR

(71) Applicant: ZF Friedrichshafen AG, Friedrichshafen (DE)

(72) Inventor: Peter Ziemer, Tettnang (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 248 days.

(21) Appl. No.: 15/309,864

(22) PCT Filed: Apr. 9, 2015

(86) PCT No.: PCT/EP2015/057651
§ 371 (c)(1),
(2) Date: Nov. 9, 2016

(87) PCT Pub. No.: WO2015/169523
PCT Pub. Date: Nov. 12, 2015

(65) Prior Publication Data
US 2017/0144527 A1 May 25, 2017

(30) Foreign Application Priority Data

May 9, 2014 (DE) .......................... 10 2014 208 799

(51) Int. Cl.
*B60K 6/365* (2007.10)
*B60K 6/26* (2007.10)
(Continued)

(52) U.S. Cl.
CPC ................ *B60K 6/365* (2013.01); *B60K 6/26* (2013.01); *B60K 6/36* (2013.01); *B60K 6/40* (2013.01);
(Continued)

(58) Field of Classification Search
None
See application file for complete search history.

(56) References Cited

U.S. PATENT DOCUMENTS 6,835,157 B2  12/2004  Haka
8,257,215 B2   9/2012  Borntraeger
(Continued)

FOREIGN PATENT DOCUMENTS

DE   102004024866 A1   12/2004
DE   102007005438 A1    8/2008
(Continued)

OTHER PUBLICATIONS

German Search Report DE102014208799.6, dated Dec. 16, 2014. (8 pages).
(Continued)

*Primary Examiner* — Justin Holmes
(74) *Attorney, Agent, or Firm* — Dority & Manning, P.A.

(57) ABSTRACT

A transmission includes an electric motor arranged between a drive shaft connection area and an output shaft connection area. The electric motor encloses a cylindrical volume. A first group of shifting elements is arranged adjacent to and axially along a drive shaft in the direction of the drive shaft connection area offset to the electric motor or is at least partially arranged within the cylindrical volume of the electric motor. Shift forks of the first group of shifting element actuators are arranged adjacent to and axially along the drive shaft in the direction of the drive shaft connection area offset to the first group of shifting elements. A main gear set is arranged at least partially within the cylindrical volume of the electric motor or adjacent to axially along the drive shaft in the direction of the output shaft connection area offset to the electric motor.

22 Claims, 3 Drawing Sheets

(51) Int. Cl.
  *B60K 6/36* (2007.10)
  *B60K 6/40* (2007.10)
  *B60K 6/48* (2007.10)
  *B60K 6/547* (2007.10)
  *F16H 3/72* (2006.01)

(52) U.S. Cl.
  CPC ............... *B60K 6/48* (2013.01); *B60K 6/547* (2013.01); *F16H 3/724* (2013.01); *B60K 2006/4816* (2013.01); *F16H 2200/201* (2013.01); *F16H 2200/2007* (2013.01); *F16H 2200/2012* (2013.01)

(56) References Cited

U.S. PATENT DOCUMENTS

| | | | |
|---|---|---|---|
| 8,272,464 B2 | 9/2012 | Reinhart et al. | |
| 8,992,362 B2 | 3/2015 | Ziemer et al. | |
| 2004/0235607 A1* | 11/2004 | Haka | F16H 3/66 475/269 |
| 2005/0133286 A1* | 6/2005 | Oshidari | B60K 6/26 180/65.225 |
| 2008/0132374 A1 | 6/2008 | Puiu | |
| 2010/0009805 A1* | 1/2010 | Bachmann | B60K 6/365 477/5 |
| 2012/0115660 A1 | 5/2012 | Puiu | |
| 2013/0267378 A1 | 10/2013 | Hiraiwa | |
| 2014/0235394 A1* | 8/2014 | Smetana | B60K 6/365 475/151 |
| 2014/0335997 A1 | 11/2014 | Hiraiwa | |

FOREIGN PATENT DOCUMENTS

| | | |
|---|---|---|
| DE | 102009016280 A1 | 11/2009 |
| DE | 102012201377 A1 | 8/2013 |
| DE | 102013005949 A1 | 10/2013 |
| JP | 2008007052 A | 1/2008 |

OTHER PUBLICATIONS

International Search Report (English Translation) PCT/EP2015/057651, dated Jun. 10, 2015. (2 pages).

* cited by examiner

GEARBOX HAVING AN ELECTRIC MOTOR

FIELD OF THE INVENTION

The present invention relates generally to a transmission with an electric motor for a drive train of a vehicle.

BACKGROUND

It is frequently the case that a transmission that is employed in the drive train of a vehicle has planetary gear sets that can be connected to each other by shifting elements, for example clutches, in order to realize different transmission ratio relationships between a drive shaft of the transmission and an output shaft of the transmission. The transmission includes a predefined number of stepped gears. Typically, a starting element (which can be, for example, a hydrodynamic or electrodynamic starting element) can be coupled to the planetary gear sets.

Various transmissions with an electric motor are known from the state of the art, with which the electric motor can be connected to an output shaft of the transmission, either directly or through a planetary gear set, with a fixed transmission ratio and/or by a shifting element. Such transmissions feature different transmission schemes and shifting matrices along with a different number of possible shiftable gears. Frequently, however, the transmissions are not designed for efficiency in terms of installation space and construction costs, but, by the transmission schemes, only specify a schematic arrangement that leaves opens the exact arrangement of the transmission elements in space and relative to each other.

SUMMARY OF THE INVENTION

Exemplary aspects of this invention provide a transmission, the structural elements of which (for example, planetary gear sets, elements of the planetary gear sets, shifting elements, shifting element actuators and electric motors) are arranged in such a manner that the transmission has a low need for installation space and low construction costs during its production phase; thus, it can be produced with the lowest possible costs.

The transmission with an electric motor for a drive train of a vehicle includes a drive shaft, which features a drive shaft connection area, an output shaft, which features an output shaft connection area, a main gear set that is formed by a first planetary gear set and a second planetary gear set, and a first group of shifting elements, of which each of the shifting elements of the first group can be actuated by a shifting element actuator of a first group of shifting element actuators.

The transmission is formed as a multi-ratio automatic transmission, which is defined as a transmission that can automatically change its transmission ratio during operation. The multi-ratio automatic transmission has a predefined number of shiftable gears; that is, the transmission ratio relationships between the input and output shafts, which can be realized by operative connections between the drive shaft, at least two components of planetary gear sets belonging to the transmission and the output shafts, are predetermined.

A shaft is not to be understood exclusively as a cylindrical, rotatably mounted machine element for transferring torque; rather, it also includes general connecting elements, which connect individual structural elements, in particular connecting elements, which connect several structural elements to each other in a torque-proof manner. Thereby, a structural element is a transmission component (for example, a planetary gear set, an element of a planetary gear set, a shifting element, a shifting element actuator, a housing and an electric motor).

The drive shaft constitutes a connecting means between the transmission and the drive source (for example, an internal combustion engine), and serves the purpose of introducing a torque of the drive source into the transmission. Thereby, the drive shaft features a rotational speed that is generated by the drive source and is thereby either connected directly to the drive shaft through its drive shaft connection area, or can be connected to the drive shaft by a clutch through the drive shaft connection area. However, the drive shaft can also feature a rotational speed that deviates from the rotational speed provided by the drive source.

The output shaft, on the other hand, guides the torque, which has been converted by the transmission, from the transmission, and thereby features a rotational speed that has been translated by the transmission. The transmission ratio of a transmission is defined as the quotient of the drive shaft rotational speed to the output shaft rotational speed. The output shaft can be connected through its output shaft connection area to other structural elements, for example, a shaft, a clutch or a generator, such that the converted torque can be transferred to such other structural elements. The drive shaft and output shaft are, for example, coaxial to each other, whereas the drive shaft connection area and the output shaft connection area can be positioned on opposite sides of the transmission.

The transmission ratio of the rotational speed and the conversion of the torque takes place by the planetary gear sets of the transmission. A planetary gear set is defined as a simple planetary transmission with exactly one carrier, to which a number of planetary gears are rotatably mounted, with exactly one sun gear and with exactly one ring gear. Thus, the elements of each planetary gear set are a sun gear, a carrier and a ring gear of the corresponding planetary gear set. Both sun gear and ring gear of a planetary gear set can also be divided into several segments. For example, it is possible for the planetary gears to mesh with two sun gear segments or two ring gear segments, which are not connected to each other. The rotational speed relationships are identical on both segments of the sun gear or on both segments of the ring gear, as if they were connected to each other.

The two planetary gear sets of the main gear set are connected to each other. This means that the two planetary gear sets are operatively connected, such that the torque of the drive shaft can be converted by the planetary gear sets. Two structural elements are referred to as connected to each other if there is a fixed (in particular, a torque-proof) connection between the structural elements. In particular, such connected structural elements rotate at the same rotational speed. Two structural elements are, in turn, referred to as connectable if there is a detachable torque-proof connection between such structural elements. In particular, if the connection is made, such structural elements rotate at the same rotational speed. Thereby, the various structural elements of the transmission can be connected to each other through a shaft or a shifting element, but also directly, for example by a welded connection, a crimped connection or another connection.

In order to bring two connectable structural elements of the transmission into operative connection, a shifting element, which can be actuated by a shifting element actuator (for example). Thereby, each shifting element has two actuating sides, of which each actuating side is connected to at least one shaft, which in turn is connected to the structural elements to be connected. A shifting element is thereby defined as a shiftable connection between two structural elements of the transmission, whereas the torque to be transferred between these two structural elements is transferred by a force closure, such as in the case of multi-disk clutches, multi-disk brakes, band brakes, cone clutches, cone brakes, or by a form closure, such as in the case of clawing clutches, claw brakes or toothed clutches. In other words, a shifting element establishes an operative connection between two structural elements.

Clutches are shifting elements which, according to their actuating state, allow a relative movement between two structural elements or form a connection for transferring a torque. A relative movement is understood, for example, as a rotation of two structural elements, whereas the rotational speed of the first structural element and the rotational speed of the second structural element are different from each other. In addition, the rotation of only one of the two structural elements is conceivable, while the other structural element is stationary or rotates in the opposite direction.

A shifting element actuator serves to actuate a shifting element. Each shifting element can be actuated (that is, closed or opened) by a shifting element actuator. A shifting element actuator can be allocated to a multiple number of shifting elements; for example, the shifting element actuator can be moved in one direction in order to actuate one shifting element, and in another direction in order to actuate another shifting element. Furthermore, a shifting element actuator is a structural element formed from a torque-proof shift fork and a rotatable actuating module. Otherwise, the shifting element actuator can be a one-piece structural element; that is, an inseparable individual structural element.

An open clutch is understood as a non-actuated clutch. This means that a relative movement between the two structural elements is possible. When the clutch is actuated (that is, closed), both structural elements accordingly rotate at the same rotational speed in the same direction.

A brake is to be understood as a shifting element that is connected on one side to a fixed structural element; for example, to a housing of the transmission. A non-actuated brake is understood as an open brake. This means that a rotatable structural element is in free-running mode; that is, the brake preferably does not affect the rotational speed of the rotatable structural element. When the brake is actuated (that is, the brake is closed), the rotational speed of the rotatable structural element is reduced to a standstill; that is, a connection between the rotatable structural element and the fixed structural element can be established.

In accordance with exemplary aspects of the invention, the electric motor includes a rotor and a stator. The electric motor is arranged between the drive shaft connection area and the output shaft connection area, and encloses a cylindrical volume, the shell surface of which is determined by an inner shell surface of the electric motor, the diameter of which matches an inner diameter of the electric motor. The inner diameter of the electric motor is defined as an inner diameter of a component of the magnetic circuit of the electric motor that actively participates in the supply of energy. This means that the cylindrical volume has the geometric shape of a straight circular cylinder, and is a material-free volume that can be used as installation space, and is suitable in shape and size for receiving transmission structural elements. In other words, one of the components of the magnetic circuit of the electric motor that actively participates in the supply of energy has a cylindrical recess enclosed by it around an axis of rotation of the electric motor. The cover surfaces of this cylindrical volume are located on the same plane as the cover surfaces of such component of the magnetic circuit of the electric motor. Thereby, a component of the magnetic circuit of the electric motor that actively participates in the supply of energy is the rotor and the stator of the electric motor.

In accordance with exemplary aspects of the invention, the first group of shifting elements is arranged adjacent to and, in an axial manner, along the drive shaft in the direction of the drive shaft connection area offset to the electric motor, or is, at least in sections, arranged within the cylindrical volume, the shell surface of which is determined by the inner shell surface of the electric motor. The first group of shifting elements is arranged either directly adjacent to the electric motor or indirectly adjacent to the electric motor. Thus, the first group of shifting elements is positioned closer to the drive shaft connection area than the electric motor.

Thereby, an adjacent position of two structural elements relative to each other is defined as a position in which the two structural elements are positioned relative to each other in such a manner that they are arranged next to each other; that is, they follow each other in a sequence. The structural elements can either adjoin each other (that is, contact each other), or can be separated from each other, for example, by an air space. This is referred to as an immediately adjacent position. No additional structural elements can be arranged between directly adjacent structural elements. However, the two structural elements can also assume an indirectly adjacent position relative to each other. Thereby, an additional structural element, or multiple structural elements, can be arranged between the two structural elements; that is, for example, the additional structural element is directly adjacent to the two indirectly adjacent structural elements.

A structural element can be realized either as an individual component or as a group of similar individual components; that is, an arrangement of a multiple number of similar individual components directly adjacent to each other. For example, the first group of shifting element actuators has individual shifting element actuators that actuate shifting elements that are different from each other, but are arranged directly adjacent to each other and have the same basic function; that is, the actuation of the shifting elements.

The longitudinal axis of rotation of the drive shaft forms that geometrical center axis of the transmission along which the individual structural elements of the transmission are arranged in the longitudinal direction. Thereby, the sequence of the transmission structural elements relative to each other is determined by the proximity of the corresponding structural element to the drive shaft connection area or to the output shaft connection area, and by the proximity of the individual transmission structural elements relative to each other. However, the structural elements need not have the same distance from the center axis.

The first group of shifting elements, as an alternative to the adjacent and axially offset arrangement to the electric motor, can be arranged, at least in sections, within the cylindrical volume, the shell surface of which is determined by the inner shell surface of the electric motor. A complete arrangement of the first group of shifting elements in the cylindrical volume is also possible. Through this arrangement of the first group of shifting elements within the cylindrical volume (that is, through this nested design), the entire structural length of the transmission can be reduced compared to a non-nested design.

The shift forks of the first group of shifting element actuators are arranged adjacent to and, in an axial manner, along the drive shaft in the direction of the drive shaft connection area offset to the first group of shifting elements. Thus, the shift forks of the first group of shifting element actuators are closest to the drive shaft connection area. Thereby, the shift forks of the first group of shifting element actuators can be arranged directly or otherwise indirectly adjacent to the first group of shifting elements, whereas the shift forks of the first group of shifting element actuators are positioned closer to the drive shaft connection area than the first group of shifting elements.

In accordance with exemplary aspects of the invention, the main gear set is arranged, at least in sections, within the cylindrical volume, the shell surface of which is determined by the inner shell surface of the electric motor, or adjacent to and, in an axial manner, along the drive shaft in the direction of the output shaft connection area offset to the electric motor. The main gear set, which is formed by two planetary gear sets, can be arranged, in sections, within the cylindrical volume enclosed by the electric motor. Thereby, the first planetary gear set can be arranged, completely or partially, and/or the second planetary gear set can be arranged, completely or partially, in the cylindrical volume. Thus, those shafts that connect the elements of the main gear set to each other can also be arranged, at least in sections, in the cylindrical volume enclosed by the electric motor. Alternatively, the main gear set can feature an axial offset to the electric motor, and can be directly or otherwise indirectly adjacent to the electric motor. The main gear set is arranged closer to the output shaft connection area than the electric motor.

According to a first embodiment, the electric motor is formed as an internal rotor, and the inner diameter of the electric motor matches the inner diameter of the rotor of the electric motor. In the case of an electric motor formed as an internal rotor, the component of the magnetic circuit of the electric motor that actively participates in the supply of energy, which features the cylindrical recess, is the rotor. An internal rotor is defined by the arrangement of the rotor and the stator relative to each other. The component of the magnetic circuit of the electric motor that rotates and actively participates in the supply of energy (the rotor) is enclosed by the component of the magnetic circuit of the electric motor that is stationary and actively participates in the supply of energy (the stator). The rotor of the electric motor, in turn, encloses the cylindrical volume.

According to an additional embodiment, the electric motor is formed as an external rotor, and the inner diameter of the electric motor matches the inner diameter of the stator of the electric motor. In the case of an electric motor formed as an external rotor, the component of the magnetic circuit of the electric motor that actively participates in the supply of energy, which features the cylindrical recess, is the stator. An external rotor is defined by the arrangement of the rotor and the stator relative to each other. The component of the magnetic circuit of the electric motor that rotates and actively participates in the supply of energy (the rotor) encloses the component of the magnetic circuit of the electric motor that is stationary and actively participates in the supply of energy (the stator). The stator of the electric motor, in turn, encloses the cylindrical volume.

According to an additional embodiment of the transmission, the first group of shifting elements is formed as a set of positive-locking shifting elements, in particular as a set of claw shifting elements. The shifting elements can be formed, for example, as claw clutches, toothed clutches, synchronization clutches or claw brakes. By using positive-locking shifting elements, the drag losses of such elements in the open state are less than, for example, those upon the use of force-fitting shifting elements.

According to an additional embodiment of the transmission, the transmission includes an upstream gear set, which is formed by a further planetary gear set. The upstream gear set is used to obtain a number of gears of the transmission that is higher than in the embodiment with only the main gear set. The upstream gear set is connected to the drive shaft and may, for example, be operatively connected to the main gear set by at least one shifting element of the first group of shifting elements. A sun gear of the upstream gear set may, for example, be connected directly to the drive shaft of the transmission. A ring gear of the upstream gear set may, for example, be torque-proof. Another connection of the sun gear of the upstream gear set or the ring gear of the upstream gear set with further structural elements of the transmission is also possible.

According to an additional embodiment of the transmission, the upstream gear set is arranged at least in sections, within the cylindrical volume, the shell surface of which is determined by the inner shell surface of the electric motor. The upstream gear set can be arranged either in a partial area (that is, only one section of the upstream gear set is enclosed by the electric motor) or in its entirety in the cylindrical volume enclosed by the electric motor. The shafts connected to the upstream gear set are led out of the cylindrical volume, such that an operative connection can be established with those transmission structural elements that are not located within the cylindrical volume enclosed by the electric motor.

According to an additional embodiment of the transmission, the upstream gear set is arranged, in an axial manner, in the direction of the drive shaft connection area offset to the electric motor, and, in an axial manner, along the drive shaft in the direction of the output shaft connection area offset to the shifting forks of the first group of shifting element actuators. Thus, the upstream gear set is positioned closer to the drive shaft connection area than the electric motor, and is positioned closer to the output shaft connection area than the shifting forks of the first group of shifting element actuators. In other words, the upstream gear set is arranged between the electric motor and the shifting forks of the first group of shifting element actuators. The distance of the upstream gear set to the electric motor and to the shifting forks of the first group of shifting element actuators can be determined individually for each realization of the transmission. The upstream gear set can be arranged directly adjacent to the electric motor. As a result, the first group of shifting elements can assume a position indirectly adjacent to the electric motor.

According to an additional embodiment of the transmission, the first group of shifting elements is arranged, at least in sections, within a cylindrical volume enclosed by a sun gear of the further planetary gear set, the shell surface of which is determined by an inner shell surface of the sun gear of the further planetary gear set, the diameter of which matches an inner diameter of the sun gear of the further planetary gear set. Similar to the cylindrical volume, the shell surface of which is determined by the inner shell surface of the electric motor, the further planetary gear set, which forms the upstream gear set, can be designed in such a manner that the sun gear of the further planetary gear set is suitable in shape and size for receiving transmission structural elements, and the cylindrical volume has the shape of a straight circular cylinder. Thus, the sun gear of the further planetary gear set has a recess in the form of the straight circular cylinder, which is arranged around an axis of rotation of the sun gear of the further planetary gear set, is usable as installation space and is material-free. The diameter of this recess is the inner diameter of the sun gear of the further planetary gear set. The shell surface of the cylindrical recess (that is, the inner shell surface of the sun gear of the further planetary gear set) corresponds to the shell surface of the cylindrical volume enclosed by the sun gear of the further planetary gear set. The cover surfaces of this cylindrical volume are arranged on the same plane as the cover surfaces of the sun gear of the further planetary gear set. The sun gear of the further planetary gear set can partially or totally enclose the first group of shifting elements; that is, the first group of shifting elements features a nested design with the further planetary gear set. In other words, an individual shifting element of the first group of shifting elements, as a whole or in one section, or several shifting elements of the first group of shifting elements, as a whole or in one section, or all shifting elements of the first group of shifting elements, as a whole or in one section, can be arranged within the cylindrical volume that is enclosed by the sun gear of the further planetary gear set. Through this nested design, the transmission can feature a total length that is shorter than in the case of a non-nested design.

According to an additional embodiment of the transmission, the first group of shifting elements is arranged, at least in sections, within a hollow cylindrical volume, the inner shell surface of which is bounded by an outer shell surface of a ring gear of the further planetary gear set, the diameter of which matches an outer diameter of the ring gear of the further planetary gear set. This hollow cylindrical volume has the geometric shape of a straight circular hollow cylinder, and is a material-free volume that can be used as installation space, and is suitable in shape and size for receiving transmission structural elements. The inner shell surface of the hollow cylindrical volume has the same diameter as the outer shell surface of the ring gear of the further planetary gear set. The outer diameter of the ring gear of the further planetary gear set is that diameter parallel to its toothing line that, on the outer shell surface of the ring gear of the further planetary gear set, is closest to the toothing line. The cover surfaces of this hollow cylindrical volume are arranged on the same plane as the cover surfaces of the ring gear of the further planetary gear set. The first group of shifting elements can be arranged, at least in sections, or alternatively as a whole, within this hollow cylindrical volume. This means that a single shifting element of the first group of shifting elements in one section or as a whole, or several shifting elements of the first group of shifting elements in one section or as a whole, or all shifting elements of the first group of shifting elements in one section or as a whole can be arranged within the hollow cylindrical volume, the outer shell surface of which is bounded by an outer shell surface of the ring gear of the further planetary gear set. This arrangement constitutes a nested design. In other words, the further planetary gear set is enclosed by the first group of shifting elements, at least in one area section.

According to an additional embodiment of the transmission, the first group of shifting elements is arranged adjacent to and, in an axial manner, along the drive shaft in the direction of the output shaft connection area offset to the upstream gear set. Thus, the upstream gear set is positioned closer to the drive shaft connection area than the first group of shifting elements, which therefore feature a smaller distance from the output shaft connection area than the upstream gear set. The exact distances between the individual structural elements of the transmission can be determined individually, depending on the structure of the transmission. The first group of shifting elements can be arranged directly or otherwise indirectly adjacent to the upstream gear set.

According to an additional embodiment of the transmission, the transmission includes an auxiliary gear set as a connecting element between the electric motor and the main gear set, whereas the auxiliary gear set is formed by an additional planetary gear set. Thereby, the connecting element is defined as a special structural element, by which an operative connection can be established between two structural elements, whereas the connecting element can convert the rotational speeds of the structural elements connected to it.

The auxiliary gear set is formed by the additional planetary gear set. The auxiliary gear set serves the purpose of, for example, converting the torque provided by the electric motor. By the operative connection established through the auxiliary gear set, the electric motor may, for example, be made more compact and lighter, since, given the conversion of the torque provided by the electric motor, the rotor of the electric motor has to apply a lower torque than without the auxiliary gear set. A sun gear of the additional planetary gear set can be connected (for example, directly or by an additional shifting element) to the rotor of the electric motor, a ring gear of the additional planetary gear set can be connected (for example, directly or by a different shifting element) to a carrier of the main planetary gear set and/or a carrier of the additional planetary gear set, for example with a sun gear of the first planetary gear set and a sun gear of the second planetary gear set.

According to an additional embodiment of the transmission, the auxiliary gear set is arranged, at least in sections, within the cylindrical volume, the shell surface of which is determined by the inner shell surface of the electric motor. In other words, the auxiliary gear set has a nested design with the electric motor. Thereby, the auxiliary gear set can be arranged, in sections, in this cylindrical volume or in its entirety, whereas the shafts connected to the auxiliary gear set are led out of this cylindrical volume, such that operative connections to other structural elements of the transmission can be established. Given the nested design of the auxiliary gear set and the electric motor, the transmission can have a shorter overall length than in the case of a non-nested construction. The shafts over which the operative connections between the electric motor, the auxiliary gear set and the main gear set are established are reduced in length by the nested design, such that the construction costs for the transmission and the weight of the transmission are reduced, as compared to a non-nested design.

According to an additional embodiment of the transmission, the auxiliary gear set is arranged adjacent to and, in an axial manner, along the drive shaft in the direction of the output shaft connection area offset to the electric motor and, in an axial manner, along the drive shaft in the direction of the drive shaft connection area offset to the main gear set. Thus, the auxiliary gear set is positioned closer to the output shaft connection area than the electric motor and closer to the drive shaft connection area than the main gear set. In other words, the auxiliary gear set is arranged between the electric motor and the main gear set. The auxiliary gear set can be directly or otherwise indirectly adjacent to the electric motor. The main gear set can be directly or otherwise indirectly adjacent to the main gear set.

According to an additional embodiment of the transmission, the transmission has a second group of shifting elements with a corresponding second group of shifting element actuators. Thereby, the second group of shifting elements can be represented by shifting elements, which are designed as positive-locking clutches (such as claw clutches) or preferably as positive-locking brakes (such as claw brakes). Thereby, the second group of shifting element actuators is used for actuating the second group of shifting elements, whereas each of the shifting element actuators of the second group of shifting element actuators is formed from one shift fork and one actuating module. The second group of shifting elements can be actuated (that is, closed) by the second group of shifting element actuators, and can be brought back from the actuated state into the non-actuated state (that is, opened). The second group of shifting element actuators can be operatively connected to the first group of shifting element actuators or otherwise can be partially represented by the first group of shifting element actuators; that is, for example, a shift fork of the first group of shifting element actuators can be operatively connected to an actuating module of the second group of shifting element actuators, and can represent a shifting element actuator for both the first and the second group of shifting elements.

According to an additional embodiment of the transmission, the second group of shifting elements is arranged adjacent to and, in an axial manner, along the drive shaft in the direction of the output shaft connection area offset to the electric motor. Thus, the second group of shifting elements is arranged closer to the output shaft connection area than the electric motor, and can be arranged directly or otherwise indirectly adjacent to the electric motor. The second group of shifting elements may, for example, be operatively connected to one element of the main gear set, such that such element can be fixed. An operative connection with an element of the upstream gear set or the auxiliary gear set is also possible.

According to an additional embodiment of the transmission, the second group of shifting elements is arranged, at least in sections, within a hollow cylindrical volume, the inner shell surface of which is bounded by an outer shell surface of a ring gear of the first planetary gear set, the diameter of which matches an outer diameter of the ring gear of the first planetary gear set. This hollow cylindrical volume has the geometric shape of a straight circular hollow cylinder, and is a material-free volume that can be used as installation space, and is suitable in shape and size for receiving transmission structural elements. The inner shell surface of the hollow cylindrical volume has the same diameter as the outer shell surface of the ring gear of the first planetary gear set. The outer diameter of the ring gear of the first planetary gear set is that diameter parallel to its toothing line that, on the outer shell surface of the ring gear of the first planetary gear set, is closest to the toothing line. The cover surfaces of this hollow cylindrical volume are arranged on the same plane as the cover surfaces of the ring gear of the first planetary gear set. The second group of shifting elements may, at least in sections, enclose the first planetary gear set. This means that a single shifting element of the second group of shifting elements in one section or as a whole, or several shifting elements of the second group of shifting elements in one section or as a whole, or all shifting elements of the second group of shifting elements in one section or as a whole can be arranged within the hollow cylindrical volume, the inner shell surface of which is bounded by an outer shell surface of the ring gear of the first planetary gear set. By the shafts connected to the second group of shifting elements, which are led out of the additional cylindrical outer construction volume, an operative connection to other structural elements of the transmission can be established.

According to an additional embodiment of the transmission, the second group of shifting elements is arranged, at least in sections, within a hollow cylindrical volume, the inner shell surface of which is bounded by an outer shell surface of a ring gear of the additional planetary gear set, the diameter of which matches an outer diameter of the ring gear of the additional planetary gear set. This hollow cylindrical volume has the geometric shape of a straight circular hollow cylinder, and is a material-free volume that can be used as installation space, and is suitable in shape and size for receiving transmission structural elements. The inner shell surface of the hollow cylindrical volume has the same diameter as the outer shell surface of the ring gear of the additional planetary gear set. The outer diameter of the ring gear of the additional planetary gear set is that diameter parallel to its toothing line that, on the outer shell surface of the ring gear of the additional planetary gear set, is closest to the toothing line. The cover surfaces of this hollow cylindrical volume are arranged on the same plane as the cover surfaces of the ring gear of the additional planetary gear set. Thus, the second group of shifting elements can enclose the additional planetary gear set, either at least in sections or as a whole. This means that a single shifting element of the second group of shifting elements in one section or as a whole, or several shifting elements of the second group of shifting elements in one section or as a whole, or all shifting elements of the second group of shifting elements in one section or as a whole can be arranged within the hollow cylindrical volume, the outer shell surface of which is bounded by an outer shell surface of the ring gear of the additional planetary gear set. By the shafts connected to the second group of shifting elements, which are led out of the additional cylindrical outer construction volume, an operative connection to other structural elements of the transmission can be established.

According to an additional embodiment of the transmission, a housing encloses the structural elements of the transmission, except for the drive shaft connection area and the output shaft connection area, and the housing is designed in a pot shape, whereas the housing has a center axis, which is coaxial to the output shaft, and the output shaft of the center axis is guided along the housing. The housing is formed similar to a pot, which is suitable in shape and dimension for receiving the structural elements of the transmission. The pot-shaped configuration is a structural form of the housing that can be realized cost-effectively.

The pot-shaped housing has a housing base that is arranged on the side of the transmission closest to the output shaft connection area. The housing base is firmly connected to the housing of the transmission. The housing and the housing base can be produced, for example, in a casting process made of a single piece, such that the housing and the housing base are connected to each other in a non-detachable manner.

The center axis of the housing is also defined as the longitudinal geometric axis of the housing that is parallel to the geometric center axis of the transmission. However, the center axis of the housing and the center axis of the transmission can also be coaxial. The center axis of the housing runs through the housing base, which has a recess, which is arranged around the center axis, for the output shaft. The area of the output shaft that is outside the housing is the output shaft connection area.

According to an additional embodiment of the transmission, the rotor of the electric motor is mounted by a bearing shield, which is arranged adjacent to and, in an axial manner, along the drive shaft in the direction of the output shaft connection area offset to the shifting forks of the first group of shifting element actuators. Thus, the bearing shield is positioned closer to the output shaft connection area than the shift forks of the first group of shifting element actuators. The bearing shield is connected to the rotor of the electric motor and to the housing of the transmission in such a manner that the rotor is mounted, whereas the bearing shield is preferably formed as a one-piece structural element, which is produced from a single structural element. Given the mounting, the rotor of the electric motor can only perform a rotational movement around an axis of rotation, which is coaxial to the drive shaft rotational axis, and is largely secured against other movements or forces. The mounting of the rotor by the bearing shield results in a cost-effective mounting solution, due to the time-saving and cost-effective production method of the bearing shield.

According to an additional embodiment of the transmission, the housing has a cover that can be connected to the housing, which is arranged adjacent to and, in an axial manner, along the drive shaft in the direction of the drive shaft connection area offset to the shifting forks of the first group of shifting element actuators, whereas the drive shaft is mounted by the cover. The cover can be preferably formed as a one-piece structural element (that is, as an individual part made from a single component), or as a multi-piece structural element (that is, from a structural element with several individual parts). The housing and the cover can be connected to each other. This connection can be realized by a detachable connection, for example by a screw or a plug connection.

The cover is positioned closer to the drive shaft connection area than the shifting forks of the first group of shifting element actuators. Thus, the cover is closest to the drive shaft connection area, and closes the housing on the side of the drive shaft connection area. The drive shaft is guided through a recess in the cover from the housing, whereas that area of the drive shaft that is arranged outside the housing is the drive shaft connection area. The drive shaft is mounted by the cover, such that it can only perform rotational movements around its axis of rotation. The drive shaft is largely secured by the cover against other forms of movement and forces. The mounting of the drive shaft by the cover results in a cost-effective mounting solution, due to the time-saving and cost-effective production method of the cover.

According to an additional embodiment of the transmission, the transmission has an additional electric motor, which is connectable or connected to the drive shaft. The additional electric motor is positioned close to the drive shaft connection area and is connected to the drive shaft, whereas either a direct operative connection by a shaft or an operative connection by a clutch can be established. A torque can be delivered to the drive shaft through the rotor of the additional electric motor, and the drive source, for example an internal combustion engine, can thereby be started. This has the advantage that the starting can be carried out without affecting a simultaneous electric driving operation, in which the motor vehicle is driven solely by the electric motor. Thereby, the additional electric motor can be connected to a converter, through which the additional electric motor is connected to an energy storage device. For this purpose, any form of energy storage device (in particular, an electrochemical, electrostatic, hydraulic or mechanical energy storage device) is suitable.

According to an additional embodiment of the transmission, the transmission has an oil pump, which is arranged adjacent to and, in an axial manner, along the drive shaft in the direction of the output shaft connection area offset to the main gear set and within the housing, whereas the oil pump is operatively connected to the output shaft and can be driven by the output shaft. The oil pump is positioned within the housing closer to the output shaft connection area than the main gear set, and can be positioned close to the housing base. It is advantageous that the output shaft can drive the oil pump, such that an additional drive is not required for the oil pump.

BRIEF DESCRIPTION OF THE DRAWINGS

On the basis of the figures described below, various embodiments and details of the invention are more specifically described. The following is shown.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
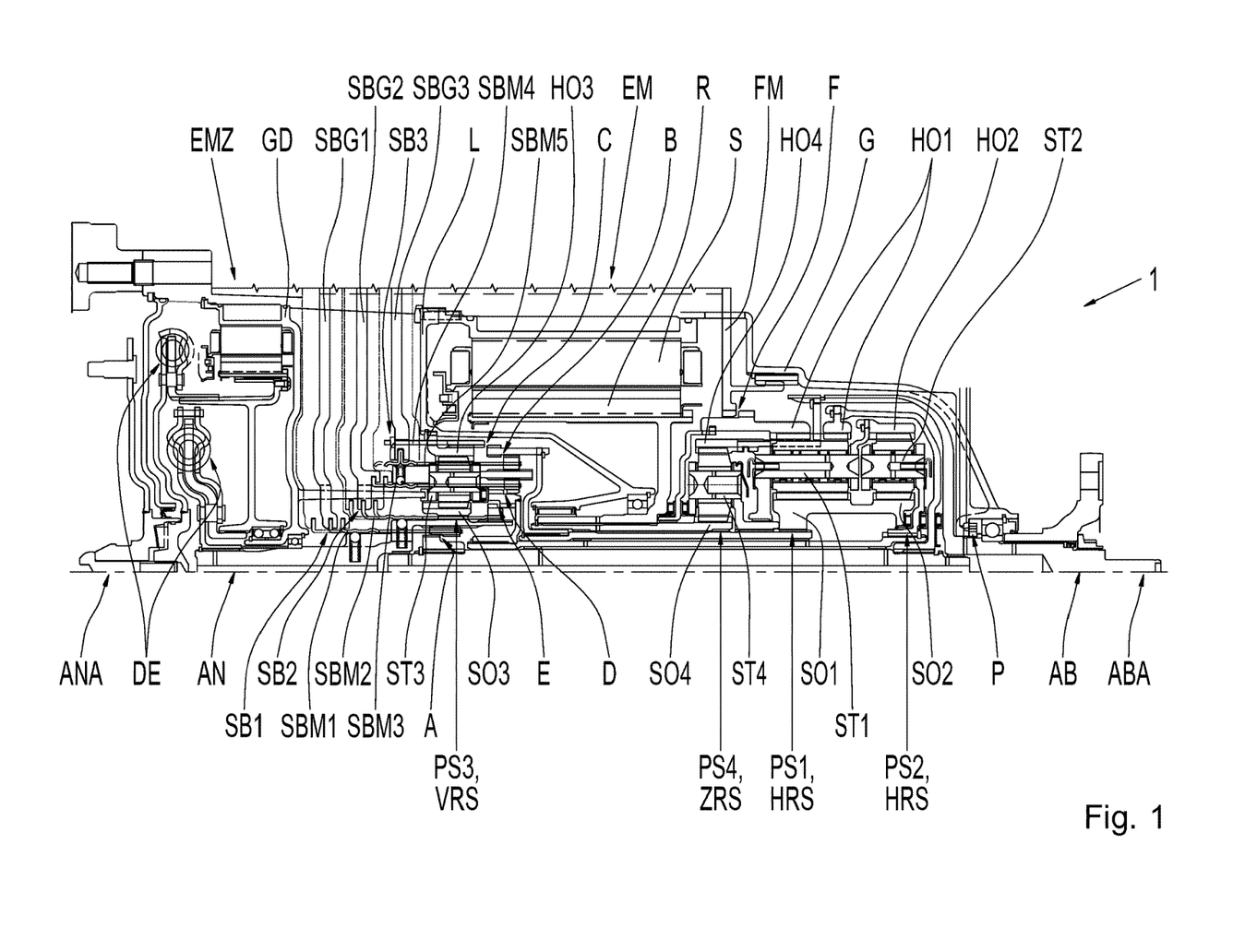
FIG. 1 a sectional view of an embodiment of a transmission.

FIG. 1 shows a sectional view of an embodiment of a transmission 1. The transmission 1 is shown in a longitudinal section, whereas, based on the rotational symmetry, only a transmission section split at the center axis of the transmission 1 is shown. Here, the center axis of the transmission 1 is shown as a dash-dot line. The transmission 1 features a drive shaft AN that runs along the center axis, the center axis also constitutes the axis of rotation of the drive shaft AN. The drive shaft AN features a drive shaft connection area ANA, which indicates that area of the drive shaft AN through which a torque, which is generated by a drive source (for example, an internal combustion engine, can be introduced into the transmission 1. Thus, the drive shaft connection area ANA marks the input of the transmission 1. An output shaft AB is arranged in a coaxial manner to the drive shaft AN. This also runs along the center axis of the transmission 1. The output shaft AB features an output shaft connection area ABA, which indicates that area of the output shaft AB, through which the torque converted in the transmission 1 is led out of the transmission 1. Thus, the drive shaft connection area ABA marks a transmission output, and is located opposite to the drive shaft connection area ANA at the opposite side of the transmission 1.

The transmission 1 is outwardly bounded by a housing G, which encloses all other structural elements including the transmission 1, except for the drive shaft connection area ANA and the output shaft connection area ABA. Thus, the transmission 1 can be connected to additional drive train elements, for example a drive source (such as an internal combustion engine) in the case of the drive shaft connection area ANA.

An electric motor EM, which is an internal rotor, belonging to the transmission 1 is enclosed by the housing G. The electric motor EM features a rotor R and a stator S, whereas the stator S is connected to the housing G, such that it is torque-proof. When the transmission section is viewed lengthwise, the electric motor EM is arranged along the center axis in a central area of the transmission 1 between the drive shaft connection area ANA and the output shaft connection area ABA. The rotor R is mounted with a bearing shield L in such a manner that this rotor can only perform a rotational movement around the center axis. With its inner shell surface turned away from the stator S, the rotor R determines a shell surface of a cylindrical volume, which features the geometric shape of a straight circular cylinder, and the diameter of which matches an inner diameter of the electric motor EM; that is, an inner diameter of the rotor R of the electric motor EM. The cover surfaces of this cylindrical volume are determined by the cover surfaces of the rotor R. A first cover surface of the rotor R is turned towards the drive shaft connection area ANA; a second cover surface of the rotor R is turned towards the output shaft connection area ABA. The cylindrical volume is suitable in shape and dimension for receiving the structural elements of the transmission 1.

In addition to the structural elements already mentioned, the structural elements of the transmission 1 include a main gear set HRS, an upstream gear set VRS, an auxiliary gear set ZRS, a first group of shifting elements represented by a first shifting element A, a second shifting element B, a third shifting element C, a fourth shifting element D and a fifth shifting element E, a second group of shifting elements, represented by a shifting element F, three shifting element actuators SB1, SB2, SB3, each of which is formed from a shift fork SBG1, SBG2, SBG3 and from two actuating modules SBM1, SBM2, SBM3, SBM4, SBM5, FM, a cover GD, a bearing shield L, an oil pump P and an additional electric motor EMZ. Each shifting element A; B; C, D, E of the first group of shifting elements and each shifting element F of the second group of shifting elements can establish a connection between two structural elements through two shafts; thus, each shifting element A, B, C, D, E features a total of two actuating sides, of which each actuating side is connected to one of the shafts to be connected. The main planetary gear set HRS features a first planetary gear set PS1 and a second planetary gear set PS2, whereas the first planetary gear set PS1 features a ring gear HO1 with two segments, a carrier ST1 and a sun gear SO1, and the second planetary gear set PS2 features a ring gear HO2, a carrier ST2 and a sun gear SO2. The upstream gear set has a further planetary gear set PS3, which in turn features a ring gear HO3, a carrier ST3 and a sun gear SO3. The auxiliary gear set ZRS features an additional planetary gear set PS4, which features a ring gear HO4, a carrier ST4 and a sun gear SO4.

In the following, an axial direction always refers to the center axis, along which the corresponding structural element can assume a position close to the drive shaft connection area ANA or close to the output shaft connection area ABA. In the following, a radial direction always refers to this center axis. The corresponding structural elements can assume a position close to the center axis, that is, close to the drive shaft AN, or distant from the center axis and thus close to the housing G.

When viewed radially from the center axis, the third shifting element C is positioned closest to the rotor R of the electric motor EM, whereas the third shifting element C is arranged within the cylindrical volume, the shell surface of which is bounded by the rotor R, on the side of the cylindrical volume turned towards the drive shaft connection area ANA. The third shifting element C is open in the position shown here, and can establish an operative connection between the housing G and the carrier ST4 of the auxiliary gear set ZRS and between the housing G and the sun gears SO1, SO2 of the main gear set HRS. A first actuating side of the third shifting element C is connected to the housing G through a shaft; that is, the third shifting element C is designed as a brake, in this embodiment a claw brake. The second actuating side of the third shifting element C and the first actuating side of the second shifting element B are arranged on a common shaft. This common shaft of the second shifting element B and the third shifting element C is arranged within the cylindrical volume, the shell surface of which is bounded by the rotor R, on the side of the cylindrical volume turned towards the drive shaft connection area ANA.

The second shifting element B is arranged, in a radial manner, closest to the middle axis to the third shifting element C, which second shifting element B is also positioned within the cylindrical volume, which is bounded by the rotor R, on the side of the cylindrical volume turned towards the drive shaft connection area ANA. The second shifting element B is arranged, in an axial manner, further from the drive shaft connection area ANA than the third shifting element C and, in a radial manner, closer to the center axis than the third shifting element C. In the position shown here, the second shifting element B is open. In the closed state, the second shifting element B can establish an operative connection between the sun gears SO1, SO2 of the main gear set HRS and the carrier ST3 of the upstream gear set VRS. In this embodiment, the second shifting element B is formed as a claw clutch.

The first actuating side of the second shifting element B is firmly connected to the main gear set HRS by a shaft formed from several individual sections. This shaft initially runs within the cylindrical volume, the shell surface of which is bounded by the rotor R, and leaves the cylindrical volume on the side parallel to the center axis turned towards the output shaft connection area ABA.

The fourth shifting element D is arranged, in a radial manner, closer to the center axis than the second shifting element B, which fourth shifting element D is positioned within the cylindrical volume, the shell surface of which is bounded by the rotor R, on the side of the cylindrical volume turned towards the drive shaft connection area ANA. The fourth shifting element D is arranged parallel to the second shifting element B, whereas the second actuating side of the second shifting element B is connected to the same shaft as the first actuating side of the fourth shifting element D, and they are located directly opposite to each other in the state shown here. In other words, the second shifting element B and the fourth shifting element D, assume, in an axial manner, the same position with respect to the drive shaft connection area ANA.

The fourth shifting element D is open in the position shown and, in the closed state, can establish an operative connection between the carrier ST3 of the upstream gear set VRS and the carrier ST2 of the second planetary gear set PS2 of the main gear set HRS. This is effected by a shaft, which is formed from several individual sections, on which the second actuating side of the fourth shifting element D is arranged, and which is arranged within a cylindrical volume, the shell surface of which is determined by the rotor R. The first actuating side of the fifth shifting element E is also arranged on such shaft. This shaft runs parallel to the center axis first in the cylindrical volume, the shell surface of which is bounded by the rotor R, and leaves this at the side turned away from the drive shaft connection area ANA in the direction of the output shaft connection area ABA parallel to the center axis. In this embodiment, the fourth shifting element D is formed as a claw clutch.

The fifth shifting element E is arranged, in a radial manner, closer to the center axis than the fourth shifting element D, whereas the fifth shifting element E is arranged parallel to the fourth shifting element D within the cylindrical volume, the shell surface of which is bounded by the rotor R, on the side of the cylindrical volume turned towards the drive shaft connection area ANA. In other words, in an axial manner, the fifth shifting element E assumes the same position as the fourth shifting element D. With its first actuating side, the fifth shifting element E is arranged on a common shaft with the second actuating side of the fourth shifting element D. With its second actuating side, the fifth shifting element E is connected directly to the upstream gear set VRS and to the drive shaft AN through a vertically adjoining shaft, which, in one section, runs parallel to the center axis. By the fifth shifting element E, in the closed state, an operative connection can be established between the sun gear SO3 of the upstream gear set VRS, the drive shaft AN connected thereto, and the carrier ST2 of the second planetary gear set PS2 of the main gear set HRS. Here, the fifth shifting element E is shown in the open state and is formed as a claw clutch.

The first shifting element A is arranged, in a radial manner, closest to the center axis, whereas, outside of the cylindrical volume, which is bounded by the rotor R, it is arranged, in an axial manner, closer to the drive shaft connection area ANA than the electric motor EM and than the third shifting element C. With its first actuating side, the first shifting element A is connected directly to the drive shaft AN; however, with its second actuating side, the first shifting element A is connected to the main gear set HRS through a shaft that initially runs parallel to the center axis and is formed from several individual sections. Thus, in the closed state, the first shifting element A can establish an operative connection between the drive shaft AN and a first segment of the ring gear HO1 of the first planetary gear set PS1 of the main gear set HRS. In the position shown here, the first shell element A is shown open and is formed as a claw clutch.

In the cylindrical volume, the shell surface of which is bounded by the rotor R, the sequence of the shifting elements B, C, D, E is viewed radially from the electric motor EM in the direction of the center axis. The third shifting element C is closest to the electric motor EM, followed by the second shifting element B, thereupon the fourth shifting element D, followed by the fifth shifting element E. The first shifting element A is positioned closest to the center axis, whereas this shifting element is arranged outside this cylindrical volume.

Each shifting element A, B, C, D, E of the first group of shifting elements and each shifting element F of the second group of shifting elements can be actuated by a shifting element actuator SB1, SB2, SB3. The first shifting element actuator SB1 is formed by a first shift fork SBG1, which runs perpendicular to the center axis, a first actuating module SBM1, which runs parallel to the center axis, and an actuating module FM of the shifting element F of the second group of shifting elements, which run perpendicular to the center axis. Of the shift forks SBG1, SBG2, SBG3 of the first group of shifting element actuators SB1, SB2, SB3, the first shift fork SBG1 is arranged closest to the drive shaft connection area ANA in an axial manner and to the center axis in a radial manner. The shift fork SBG1 of the first shifting element actuator SB1 can be moved parallel to the center axis. Of all of the actuating modules SBM1, SBM2, SBM3, SBM4, SBM5, FM, the first actuating module SBM1 is arranged, in a radial manner, closest to the center axis. The actuating module FM of the shifting element F of the second group of shifting elements is arranged, in a radial manner, furthest away from the center axis.

On its side turned towards the drive shaft connection area ANA, the first actuating module SBM1 is connected to the first shifting fork SBG1 and, on the side turned towards the output shaft connection area ABA, is connected to the first shifting element A. The actuating module FM of the shifting element F of the second group of shifting elements is connected to the first shift fork SBG1 and the shifting element F. Thus, the first shifting element actuator SB1 serves to open or close the first shifting element A and the shifting element F. The first shift fork SBG1 can assume an initial position, in which the first shifting element A is fully open, the shifting element F is fully closed, and the first shift fork SBG1 is positioned, in an axial manner, furthest from the drive shaft connection area ANA, in the positions possible for the first shift fork SBG1. The first shift fork SBG1 can assume an end position, in which the first shifting element A is fully closed, the shifting element F is fully open, and the first shift fork SBG1 is positioned, in an axial manner, closest to the drive shaft connection area ANA in the positions possible for the first shift fork SBG1. The first shift fork SBG1 can be moved between its initial and end positions. In other words, the first shifting element A can never be closed simultaneously with the shifting element F.

The second shifting element actuator SB2 is formed by a second shift fork SBG2, which runs perpendicular to the center axis, a second actuating module SBM2, which runs parallel to the center axis, and a third actuating module SBM3, which runs parallel to the center axis. The second shift fork SBG2 is arranged, in an axial manner, further from the drive shaft connection area ANA than the first shift fork SBG1, and, in a radial manner, further from the center axis than the first shift fork SBG1. The second shift fork SBG2 can be moved parallel to the center axis.

The second actuating module SBM2 is arranged, in a radial manner, further from the center axis than the first actuating module SBM1. On its side turned towards the drive shaft connection area ANA, the second actuating module SBM2 is connected to the second shift fork SBG2 and, on its side turned towards the output shaft connection area ABA, is connected to the fifth shifting element E. The third actuating module SBM3 is arranged, in a radial manner, further from the center axis than the second actuating module SBM2. On its side turned towards the drive shaft connection area ANA, the third actuating module SBM3 is connected to the second shift fork SBG2 and, on its side turned towards the output shaft connection area ABA, is connected to the fourth shifting element D.

The second shift fork SBG2 can assume an initial position, in which the fourth shifting element D is closed, the fifth shifting element E is open, and the second shift fork SBG2 is positioned,
in an axial manner, closest to the drive shaft connection area ANA in the positions possible for the second shift fork SBG2. The second shift fork SBG2 can assume an end position, in which the fourth shifting element D is open, the fifth shifting element E is closed, and the second shift fork SBG2 is positioned, in an axial manner, furthest from the drive shaft connection area ANA in the positions possible for the second shift fork SBG2. The second shift fork SBG2 can be moved between its initial and its end positions. In other words, the fourth shifting element D can never be closed simultaneously with the fifth shifting element E.

The third shifting element actuator SB3 is formed by a third shift fork SBG3, which runs perpendicular to the center axis, a fourth actuating module SBM4, which runs parallel to the center axis, and a fifth actuating module SBM5, which runs parallel to the center axis. The third shift fork SBG3 is arranged, in an axial manner, further from the drive shaft connection area ANA than the second shift fork SBG2, and, in a radial manner, further from the center axis than the second shift fork SBG2. The third shift fork SBG3 can be moved parallel to the center axis.

The fifth actuating module SBM5 is arranged, in a radial manner, further from the center axis than the third actuating module SBM3. On its side turned towards the drive shaft connection area ANA, the fifth actuating module SBM5 is connected to the third shift fork SBG3 and, on its side turned towards the output shaft connection area ABA, is connected to the second shifting element B. The fourth actuating module SBM4 is arranged, in a radial manner, further from the center axis than the fifth actuating module SBM5. On its side turned towards the drive shaft connection area ANA, the fourth actuating module SBM4 is connected to the third shift fork SBG3 and, on its side turned towards the output shaft connection area ABA, is connected to the third shifting element C.

The third shift fork SBG3 can assume an initial position, in which the second shifting element B is closed, the third shifting element C is open, and the third shift fork SBG3 is positioned, in an axial manner, closest to the drive shaft connection area ANA in the positions possible for the third shift fork SBG3. The third shift fork SBG3 can assume an end position, in which the second shifting element B is open, the third shifting element C is closed, and the third shift fork SBG3 is positioned, in an axial manner, furthest away from the drive shaft connection area ANA in the positions possible for the third shift fork SBG3. The third shift fork SBG3 can be moved between its initial and end positions. In other words, the second shifting element B can never be closed simultaneously with the third shifting element C.

The rotor R of the electric motor EM, which is the rotatable and actively electromagnetic part of the electric motor EM, is mounted by the bearing shield L. The bearing shield L is arranged, in an axial manner, further from the driving shaft connection area ANA than the third shift fork SBG3 of the third shifting element actuator SB3, but closer to the driving shaft connection area ANA than the electric motor EM. In other words, the bearing shield L is arranged, in an axial manner, between the electric motor EM and the third shift fork SBG3. In sections, the bearing shield L runs perpendicular to the center axis and is connected to the housing G.

The upstream gear set VRS is arranged directly on the side of the cylindrical volume turned towards the drive shaft connection area ANA, the shell surface of which is bounded by the rotor R of the electric motor EM, on the outside adjacent to the cylindrical volume. The upstream gear set VRS, which is formed by the further planetary gear set PS3, features the sun gear SO3, which is arranged on the same plane as the second operating side of the fifth shifting element E, along with the ring gear HO3, which is arranged on the same plane as the common shaft of the second shifting element B and the third shifting element C, and the carrier ST3, which carries the planetary gears that mesh with the sun gear SO3 and the ring gear HO3. The sun gear SO3 of the further planetary gear set PS3 of the upstream gear set VRS is connected to the second actuating side of the fifth shifting element E and to the drive shaft AN. The upstream gear set VRS is arranged, in an axial manner, in the direction of the drive shaft connection area ANA offset to the cylindrical volume, the shell surface of which is bounded by the rotor R, and, in an axially offset manner, in the direction of the output shaft connection area ABA at the third shifting element actuator SB3. This means that, when viewed axially, the upstream gear set VRS is arranged between the third shifting element actuator SB3 and a cover surface of the cylindrical volume, the shell surface of which is determined by the rotor R, located on the side of the drive shaft connection area ANA. Furthermore, the upstream gear set VRS is arranged, in a radial manner, closer to the center axis than the third shifting element C.

The inner shell surface of the sun gear SO3 of the further planetary gear set PS3 determines a shell surface of a cylindrical volume. This takes place according to the same principle as in the case of the cylindrical volume, the shell surface of which is determined by the rotor R of the electric motor EM. The diameter of the inner shell surface of the sun gear SO3 of the further planetary gear set PS3 matches an inner diameter of the sun gear SO3 of the further planetary gear set PS3, and the cover surfaces of this cylindrical volume are determined by the cover surfaces of the sun gear SO3 of the further planetary gear set PS3. A first cover surface of the sun gear SO3 of the further planetary gear set PS3 is turned towards the drive shaft connection area ANA; a second cover surface of the sun gear SO3 of the further planetary gear set PS3 is turned towards the output shaft connection area ABA. The first shifting element A is arranged within this cylindrical volume. The second actuating module SBM2 also runs through this cylindrical volume, such that the second shifting element actuator SB2 is connected to the fifth shifting element E. One section of the drive shaft AN also runs through this cylindrical volume.

An outer shell surface of the ring gear HO3 of the further planetary gear set PS3, the diameter of which matches an outer diameter of the ring gear HO3 of the further planetary gear set PS3, determines the inner shell surface of a hollow cylindrical volume. The cover surfaces of such hollow cylindrical volume are determined by the cover surfaces of the ring gear HO3 of the further planetary gear set PS3. A first cover surface of the ring gear HO3 of the further planetary gear set PS3 is turned towards the drive shaft connection area ANA; a second cover surface of the ring gear HO3 of the further planetary gear set PS3 is turned towards the output shaft connection area ABA. One section of the fourth actuating module SBM4 runs through this hollow cylindrical volume. The first actuating side of the third shifting element C is also arranged in this hollow cylindrical volume.

The auxiliary gear set ZRS is formed by the additional planetary gear set PS4, which features the ring gear HO4, the carrier ST4 and the sun gear SO4. The auxiliary gear set ZRS is arranged, in an axial manner, closest to the electric motor EM in the direction of the output shaft connection area ABA, and, in a radial manner, further from the center axis than the first shifting element A. The auxiliary gear set ZRS is directly connected to the rotor R of the electric motor EM through a shaft, whereas such shaft is connected to the sun gear SO4 of the additional planetary gear set PS4. The carrier ST4 of the additional planetary gear set PS4 carries the planetary gears that mesh with the sun gear SO4 and the ring gear HO4 of the additional planetary gear set PS4. The ring gear HO4 of the additional planetary gear set PS4 is located on the same plane as the third shifting element C and is connected directly to the carrier ST1 of the first planetary gear set PS1, the ring gear HO2 of the second planetary gear set PS2 of the main gear set HRS and the output shaft AB.

An outer shell surface of the ring gear HO4 of the additional planetary gear set PS4, the diameter of which matches an outside diameter of the ring gear HO4 of the additional planetary gear set PS4, determines the inner shell surface of a hollow cylindrical volume. The cover surfaces of this hollow cylindrical volume are determined by the cover surfaces of the ring gear HO4 of the additional planetary gear set PS4. A first cover surface of the ring gear HO4 of the additional planetary gear set PS4 is turned towards the drive shaft connection area ANA; a second cover surface of the ring gear HO4 of the additional planetary gear set PS4 is turned towards the output shaft connection area ABA. The shifting element F of the second group of shifting elements and one section of the second segment of the ring gear HO1 of the first planetary gear set PS1 are arranged in this hollow cylindrical volume.

The shifting element F of the second group of shifting elements is arranged, in an axial manner, closer to the output shaft connection area ABA than the auxiliary gear set ZRS, and, in a radial manner, further from the center axis than the third shifting element C. With its first actuating side, the shifting element F is connected directly to the second segment of the ring gear HO1 of the first planetary gear set PS1 of the main gear set HRS. With its second actuating side, the shifting element F is connected through a shaft to the housing G and to the actuating module FM of the shifting element F of the second group of shifting elements. In the position shown, the shifting element F is open and serves to fix the ring gear HO1 of the first planetary gear set PS1; that is, the shifting element F is formed as a brake, in this embodiment as a claw brake. The actuating module FM can be moved parallel to the center axis by the first shift fork SBG1.

The main gear set HRS, which is formed by the first planetary gear set PS1 and the second planetary gear set PS2, is, in an axial manner, closer to the output shaft connection area ABA than the shifting element F and, in a radial manner, further from the center axis than the first shifting element A, but, in a radial manner, closer to the center axis than the sun gear SO4 of auxiliary gear set ZRS. The first planetary gear set PS1 is arranged, in an axial manner, closer to the drive shaft connection area ANA than the second planetary gear set PS2, whereas such two planetary gear sets PS1 and PS2 are arranged parallel to each other. This means that the structural elements of the first planetary gear set PS1 are located on the same plane as the corresponding structural elements of the second planetary gear set PS2. For example, the ring gear HO1 of the first planetary gear set PS1 is located on the same plane as the ring gear HO2 of the second planetary gear set PS2, the sun gear SO1 of the first planetary gear set PS1 is located on the same plane as the sun gear SO2 of the second planetary gear set PS2, and the carrier ST1 of the first planetary gear set PS1 is located on the same plane as the carrier ST2 of the second planetary gear set PS2. The ring gear HO1 of the first planetary gear set PS1 can either be set in a torque-proof manner by the shifting element F or connected to the drive shaft AN by the first shifting element A. The carrier ST1 of the first planetary gear set PS1 carries the planetary gears that mesh with the sun gear SO1 and the ring gear HO1 of the first planetary gear set PS1. The carrier ST2 of the second planetary gear set PS2 carries the planetary gears that mesh with the sun gear SO2 and the ring gear HO2 of the second planetary gear set PS2.

The outer shell surface of the ring gear HO1 of the first planetary gear set PS1, the diameter of which matches an outer diameter of the ring gear HO1 of the first planetary gear set PS1, determines the inner shell surface of a hollow cylindrical volume. The cover surfaces of this hollow cylindrical volume are determined by the cover surfaces of the ring gear HO1 of the first planetary gear set PS1. A first cover surface of the ring gear HO1 of the first planetary gear set PS1 is turned towards the drive shaft connection area ANA; a second cover surface of the ring gear HO1 of the first planetary gear set PS1 is turned towards the output shaft connection area ABA. The shaft that connects the shifting element F of the second group of shifting elements to the housing G is arranged in this hollow cylindrical volume. Furthermore, one section of a shaft runs in this hollow cylindrical volume, which connects the ring gear HO1 of the first planetary gear set PS1 to the drive shaft AN, and an additional shaft connects the carrier ST1 of the first planetary gear set PS1 to the output shaft AB.

The oil pump P is arranged, in an axial manner, closer to the output shaft connection area ABA than the second planetary gear set PS2 of the main gear set HRS. In other words, the oil pump P of all structural elements of the transmission 1 is arranged closest to the output shaft connection area ABA within the housing G. The oil pump P is arranged, in a radial manner, closer to the center axis than the fifth shifting element E. The oil pump P is connected to the output shaft AB, and is driven by this.

The additional electric motor EMZ is arranged, in an axial manner, closer to the drive shaft connection area ANA than the first shifting element actuator SB1, and, in a radial manner, further from the center axis than the rotor R of the electric motor EM. The additional electric motor EMZ is connected both to the housing G of the transmission 1 and, through damping elements DE, to the drive shaft AN. The additional electric motor EMZ serves as a starter for a drive source, for example an internal combustion engine, which is connected to the drive shaft connection area ANA.

The cover GD of the housing G is arranged, in an axial manner, closer to the driving shaft connection area ANA than the first shift fork SBG1 of the first shifting element actuator SB1, but further from the driving shaft connection area ANA than the additional electric motor EMZ. In other words, the cover GD is located between the additional electric motor EMZ and the first shift fork SBG1. The cover GD is connected to the drive shaft AN, which is mounted through this cover GD. Thus, the cover GD extends, in a radial manner, outward from the center axis to the housing G.

Figure 2:
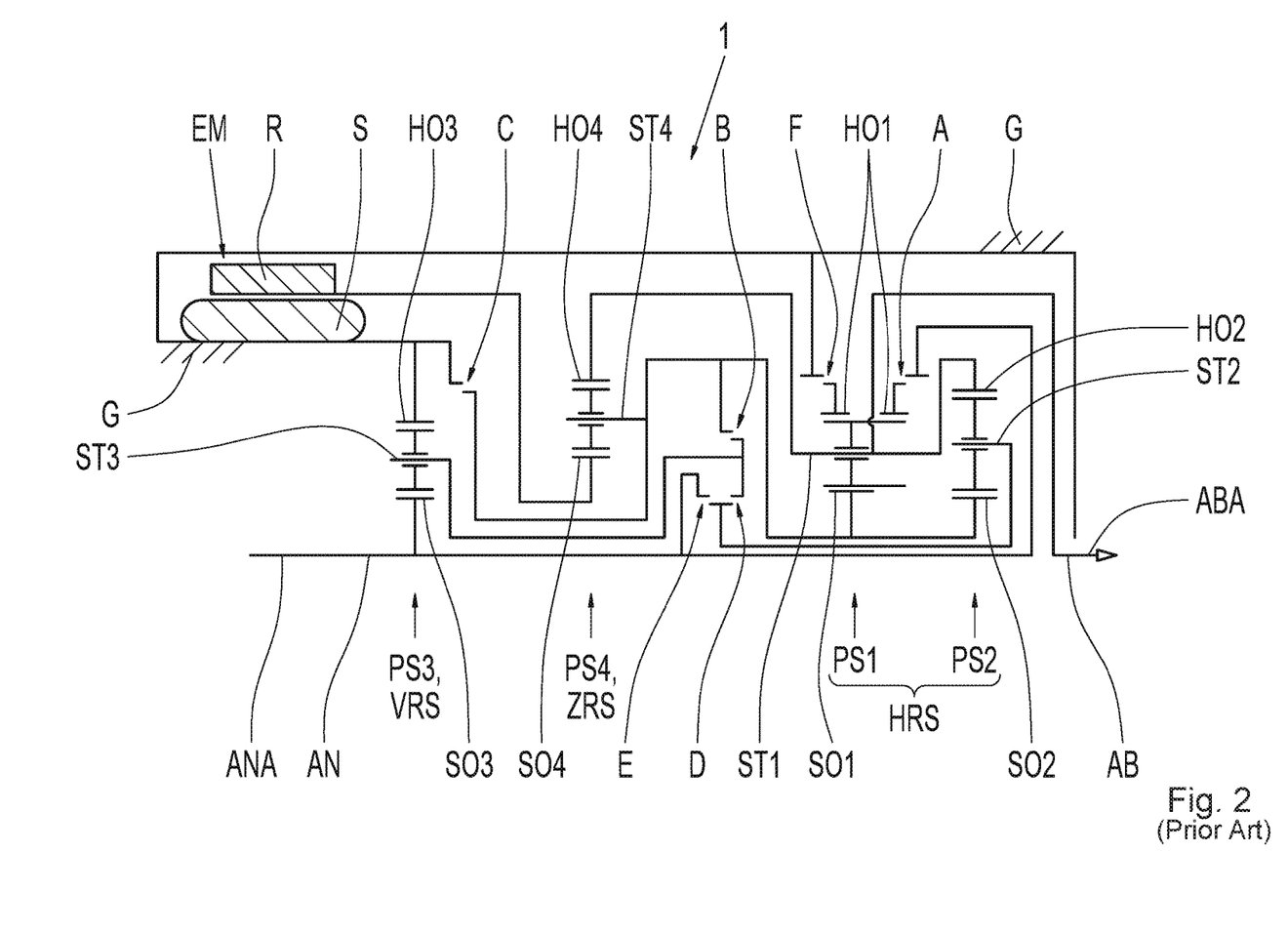
FIG. 2 an exemplary schematic view of the gear set of the transmission from FIG. 1, and FIG. 3 a schematic arrangement of the embodiment of the transmission from FIG. 1.

FIG. 2 shows an exemplary schematic view of the transmission 1 from FIG. 1, whereas, for the sake of clarity, the additional electric motor and the damping elements are not shown. This scheme, which is known from the prior art, permits, as an example, a simplified overview of the fixed and possible connections of the individual structural elements of the transmission 1, but does not show any concrete arrangement of all structural elements in space or relative to each other. With its stator S, the electric motor EM is firmly connected to the housing G. The rotor R of the electric motor EM is connected directly to a sun gear SO4 of the additional planetary gear set PS4 of the auxiliary gear set ZRS. The carrier ST4 of the additional planetary gear set PS4 can be connected (that is, set in a torque-proof manner) to the housing G through the third shifting element C. The carrier ST4 of the additional planetary gear set PS4 is firmly connected to the sun gear SO1 of the first planetary gear set PS1 and the sun gear SO2 of the second planetary gear set PS2. The ring gear HO4 of the additional planetary gear set PS4 is firmly connected to the carrier ST1 of the first planetary gear set PS1.

The upstream gear set VRS is connected directly to the drive shaft AN by the sun gear SO3 of the further planetary gear set PS3. By the first shifting element A, through the drive shaft AN, an operative connection can be established between the sun gear SO3 of the further planetary gear set PS3 and the ring gear HO1 of the first planetary gear set PS1. By the fifth shifting element E, an operative connection can also be established between the sun gear SO3 of the further planetary gear set PS3 and the carrier ST2 of the second planetary gear set PS2. By way of the fourth shifting element D, an operative connection can be established between the carrier ST3 of the further planetary gear set PS3 and the carrier ST2 of the second planetary gear set PS2. By the second shifting element B, an operative connection can be established between the carrier ST3 of the further planetary gear set PS3 and the ring gear HO1 of the first planetary gear set PS1 and with the ring gear HO2 of the second planetary gear set HO2. The ring gear HO3 of the further planetary gear set PS3 is connected to the housing G in a twist-proof manner.

The sun gear SO1 of the first planetary gear set PS1 is firmly connected to the sun gear SO2 of the second planetary gear set PS2. The carrier ST1 of the first planetary gear set PS1 is firmly connected to the ring gear HO2 of the second planetary gear set PS2 and firmly connected to the output shaft AB. The ring gear HO1 of the first planetary gear set PS1 is formed in two parts. The first part is connected to the shifting element F and can be connected (that is, fixed) to the housing. The second part is connected to the first shifting element A. The ring gear HO1 of the first planetary gear set PS1 can be connected to the drive shaft AN either by the shifting element F in a fixed manner or by the first shifting element A.

The carrier ST2 of the second planetary gear set PS2 can be operatively connected to the carrier ST3 of the further planetary gear set PS3 by the fourth shifting element D or to the sun gear SO3 of the further planetary gear set PS3 by the fifth shifting element E. The ring gear HO2 of the second planetary gear set PS2 is connected to the output shaft AB.

Figure 3:
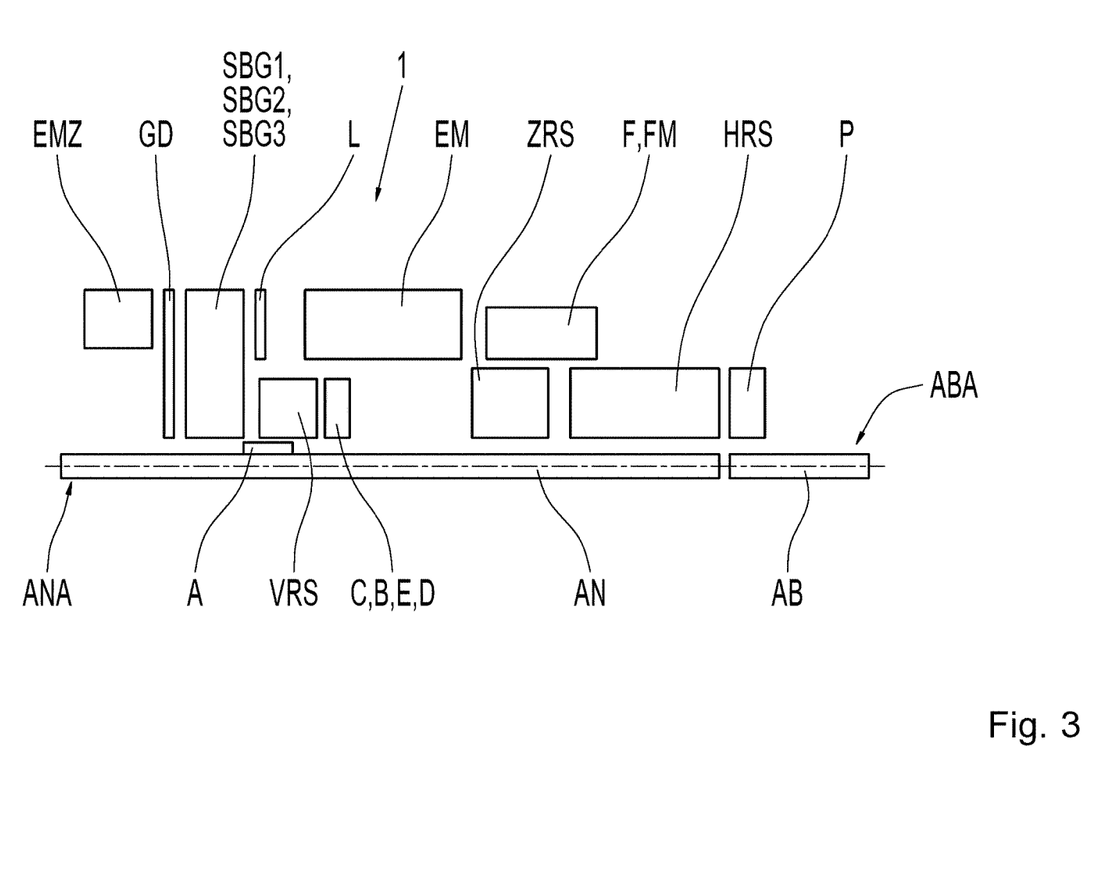

FIG. 3 shows a schematic arrangement of the embodiment of the transmission 1 from FIG. 1. For the sake of simplicity, only the structural elements of the transmission 1 that are important for the arrangement of the structural elements relative to each other are shown. The distances between the individual structural elements relative to each other are purely schematic, and do not correspond to the distances in FIG. 1. The drive shaft AN, the drive shaft connection area ANA of which bounds the arrangement scheme of the transmission 1 on a first side, runs along the center axis represented by a dash-dot line. The output shaft AB, the output shaft connection area ABA of which bounds the arrangement scheme of the transmission 1 at a second side opposite to the first side, is arranged in a coaxial manner to the drive shaft AN. The additional electric motor EMZ is arranged, in an axial manner, closest to the drive shaft connection area ANA. This features a radial distance from the center axis. The cover GD is arranged, in an axial manner, further from the drive shaft connection area ANA than the additional electric motor EMZ. In other words, the cover GD is directly adjacent, in an axial manner, to the additional electric motor EMZ. In a radial manner, the cover GD directly adjoins the drive shaft AN, and is thus positioned close to the center axis.

The group of shifting forks SBG1, SBG2, SBG3, which is positioned, in a radial manner, close to the center axis, is arranged, in an axial manner, further from the drive shaft connection area ANA than the cover GD. The group of shift forks SBG1, SBG2, SBG3 is directly adjacent, in an axial manner, to the cover GD. The bearing shield L is arranged, in an axial manner, further from the driving shaft connection area ANA than the group of shift forks SBG1, SBG2, SBG3. In a radial manner, the bearing shield L has a distance from the center axis. The upstream gear set VRS is arranged, in an axial manner, further from the drive shaft connection area ANA than the bearing shield L. The upstream gear set VRS is arranged, in a radial manner, close to the center axis, such that, in one section, the upstream gear set VRS is arranged between the drive shaft AN and the bearing shield L.

The first shifting element A of the first group of shifting elements A, B; C, E is arranged in a radial manner between the drive shaft AN and the upstream gear set VRS. In an axial manner, the first shifting element A is arranged closer to the drive shaft connection area ANA than the upstream gear set VRS. The electric motor EM is arranged, in an axial manner, further from the drive shaft connection area ANA than the bearing shield L, but the upstream gear set VRS, with one section, is arranged within the cylindrical volume, the shell surface of which is determined by the rotor of the electric motor EM. The remaining shifting elements B, C, D, E of the first group of shifting elements A, B, C, D, E are arranged fully within the cylindrical volume, the shell surface of which is determined by the rotor of the electric motor EM.

The shifting element F of the second group of shifting elements and its associated actuating module FM are arranged, in an axial manner, further from the drive shaft connection area ANA than the electric motor EM, and feature a radial distance from the center axis. The auxiliary gear set ZRS is arranged, in an axial manner, further from the drive shaft connection area ANA than the electric motor EM, but is arranged, in an axial manner, closer to the electric motor EM than the shifting element F of the second group of shifting elements and its associated actuating module FM. The auxiliary gear set ZRS is arranged, in a radial manner, close to the drive shaft AN.

The main gear set HRS is arranged, in an axial manner, further from the drive shaft connection area ANA than the auxiliary gear set ZRS and is positioned, in a radial manner, close to the drive shaft AN. In other words, the main gear set HRS is directly adjacent to the auxiliary gear set ZRS. The shifting element F of the second group of shifting elements and its associated actuating module FM enclose the main gear set HRS with one section; that is, they are arranged within the hollow cylindrical volume, the inner shell surface of which is bounded by an outer shell surface of the ring gear of the first planetary gear set of the main gear set HRS. The oil pump P is arranged, in an axial manner, further from the drive shaft connection area ANA than the main gear set HRS, and is positioned, in a radial manner, close to the output shaft AB. Thus, the oil pump is closest to the output shaft connection area ABA.

The embodiments shown here are only selected as examples. For example, other interconnection possibilities of the various planetary gear sets relative to each other can be realized, in order to obtain a different number and other gradations of gears. In addition, for example, the initial position of any shift fork can be the end position, and, likewise, the end position can be the initial position of the corresponding shift fork. Furthermore, it is possible to realize the electric motor as an external rotor instead of an internal rotor, and to largely maintain the arrangement of the structural elements of the transmission shown here, such that the advantages of the present invention are maintained. In the case of an external rotor, its stator can be supported by the bearing shield. The stator of the external rotor is enclosed by the rotor; therefore, in this case, the stator of the external rotor encloses a cylindrical volume that is suitable in shape and dimension for receiving structural elements of the transmission. The arrangement of the main gear set, the auxiliary gear set and the upstream gear set, along with the shifting element actuators and the shifting elements, relative to each other can be largely retained; for example, the auxiliary gear set can also be arranged, in an axial manner, closest to the electric motor EM in the direction of the output shaft connection area. The main gear set may, in an axial manner, follow the auxiliary gear set. The oil pump can be positioned closest to the output shaft connection area. In addition, it is possible, for example, to arrange the output shaft and the drive shaft in such a manner that the output shaft connection area and the drive shaft connection area are positioned on the same side of the transmission and parallel to each other.

Different embodiments may be combined completely and with respect to individual characteristics. Moreover, one embodiment may also be supplemented by one or more characteristics of an additional embodiment.

Modifications and variations can be made to the embodiments illustrated or described herein without departing from the scope and spirit of the invention as set forth in the appended claims.

REFERENCE SIGNS

1 Transmission
A First shifting element of the first group of shifting elements
AB Output shaft
ABA Output shaft connection area
AN Drive shaft
ANA Drive shaft connection area
B Second shifting element of the first group of shifting elements
C Third shifting element of the first group of shifting elements
D Fourth shifting element of the first group of shifting elements
DE Damping elements
E Fifth shifting element of the first group of shifting elements
EM Electric motor
EMZ Additional electric motor
F Shifting element of the second group of shifting elements
FM Actuating module of the shifting element F
G Housing
GD Cover
HO1 Ring gear of the first planetary gear set
HO2 Ring gear of the second planetary gear set
HO3 Ring gear of the further planetary gear set
HO4 Ring gear of the additional planetary gear set
HRS Main gear set
L Bearing shield
P Oil pump
PS1 First planetary gear set
PS2 Second planetary gear set
PS3 Further planetary gear set
PS4 Additional planetary gear set
R Rotor
S Stator
SB1 First shifting element actuator
SB2 Second shifting element actuator
SB3 Third shifting element actuator
SBG1 First shift fork
SBG2 Second shift fork
SBG3 Third shift fork
SBM1 First actuating module
SBM2 Second actuating module
SBM3 Third actuating module
SBM4 Fourth actuating module
SBM5 Fifth actuating module
SO1 Sun gear of the first planetary gear set
SO2 Sun gear of the second planetary gear set
SO3 Sun gear of the further planetary gear set
SO4 Sun gear of the additional planetary gear set
ST1 Carrier of the first planetary gear set
ST2 Carrier of the second planetary gear set
ST3 Carrier of the further planetary gear set
ST4 Carrier of the additional planetary gear set
VRS Upstream gear set
ZRS Auxiliary gear set

What is claimed is:

1. A transmission for a drive train of a vehicle, comprising:
    a drive shaft with a drive shaft connection area;
    an output shaft with an output shaft connection area;
    a main gear set having a first planetary gear set and a second planetary gear set;
    a first group of shifting elements;
    a first group of shifting element actuators, each of the first group of shifting element actuators operable to actuate a respective one or more of the first group of shifting elements;
    an electric motor comprising a rotor and a stator, the electric motor arranged between the drive shaft connection area and the output shaft connection area, the electric motor enclosing a cylindrical volume, a shell surface of the cylindrical volume determined by an inner shell surface of the electric motor, a diameter of the inner shell surface of the electric motor matching an inner diameter of the electric motor,
    wherein the first group of shifting elements is arranged adjacent to and axially along the drive shaft in the direction of the drive shaft connection area axially offset to the electric motor, or is at least partially arranged within the cylindrical volume of the electric motor,
    wherein each shifting element actuator of the first group of shifting element actuators is formed from one shift fork and one actuating module, the shift forks of the first group of shifting element actuators arranged adjacent to and axially along the drive shaft in the direction of the drive shaft connection area axially offset to the first group of shifting elements, and
    wherein the main gear set is arranged at least partially within the cylindrical volume of the electric motor or adjacent to and axially along the drive shaft in the direction of the output shaft connection area axially offset to the electric motor.

2. The transmission of claim 1, wherein the rotor of the electric motor is an internal rotor, the inner diameter of the electric motor matching an inner diameter of the internal rotor.

3. The transmission of claim 1, wherein the rotor of the electric motor is an external rotor, the inner diameter of the electric motor matching an inner diameter of the stator.

4. The transmission of claim 1, wherein the shifting elements of the first group of shifting elements are claw shifting elements.

5. The transmission of claim 1, further comprising an upstream planetary gear set.

6. The transmission of claim 5, wherein the upstream planetary gear set is arranged at least partially within the cylindrical volume of the electric motor.

7. The transmission of claim 5, wherein the upstream planetary gear set is arranged axially in the direction of the drive shaft connection area offset to the electric motor and axially along the drive shaft in the direction of the output shaft connection area offset to the shifting forks of the first group of shifting element actuators.

8. The transmission of claim 5, wherein the first group of shifting elements is arranged at least partially within a cylindrical volume enclosed by a sun gear of the upstream planetary gear set, a shell surface of the cylindrical volume determined by an inner shell surface of the sun gear, a diameter of the inner shell surface of the sun gear matching an inner diameter of the sun gear.

9. The transmission of claim 5, wherein the first group of shifting elements arranged at least partially within a hollow cylindrical volume, the inner shell surface of the hollow cylindrical volume bounded by an outer shell surface of a ring gear of the upstream planetary gear set, a diameter of the outer shell surface of the ring gear matching an outer diameter of the ring gear.

10. The transmission of claim 5, wherein the first group of shifting elements is arranged adjacent to and axially along the drive shaft in the direction of the output shaft connection area offset to the upstream planetary gear set.

11. The transmission of claim 1, further comprising an auxiliary planetary gear set, the auxiliary planetary gear set being a connecting element between the electric motor and the main gear set.

12. The transmission of claim 11, wherein the auxiliary planetary gear set is arranged at least partially within the cylindrical volume of the electric motor.

13. The transmission of claim 11, wherein the auxiliary planetary gear set is arranged adjacent to and axially along the drive shaft in the direction of the output shaft connection area offset to the electric motor and axially along the drive shaft in the direction of the drive shaft connection area offset to the main gear set.

14. The transmission of claim 1, further comprising a second group of shifting elements and a corresponding second group of shifting element actuators.

15. The transmission of claim 14, wherein the second group of shifting elements is arranged adjacent to and axially along the drive shaft in the direction of the output shaft connection area offset to the electric motor.

16. The transmission of claim 14, wherein the second group of shifting elements is arranged at least partially within a hollow cylindrical volume, an inner shell surface of the hollow cylindrical volume bounded by an outer shell surface of a ring gear of the first planetary gear set, a diameter of the outer shell surface of the ring gear of the first planetary gear set matching an outer diameter of the ring gear of the first planetary gear set.

17. The transmission of claim 14, further comprising an auxiliary planetary gear set, the auxiliary planetary gear set being a connecting element between the electric motor and the main gear set, the second group of shifting elements arranged at least partially within a hollow cylindrical volume, an inner shell surface of the hollow cylindrical volume bounded by an outer shell surface of a ring gear of the auxiliary planetary gear set, the diameter of the outer shell surface of the ring gear of the auxiliary planetary gear set matching an outer diameter of the ring gear of the auxiliary planetary gear set.

18. The transmission of claim 1, further comprising a housing that encloses structural elements of the transmission except for the drive shaft connection area and the output shaft connection area, the housing is formed in one piece and is cylindrically shaped, the housing having a center axis, the center axis being coaxial to the output shaft, the output shaft guided along the housing.

19. The transmission of claim 18, wherein the rotor of the electric motor is mounted by a bearing shield, the bearing shield arranged adjacent to and axially along the drive shaft in the direction of the output shaft connection area offset to the shifting forks of the first group of shifting element actuator.

20. The transmission of claim 18, further comprising a cover connectable to the housing, the cover arranged adjacent to and axially along the drive shaft in the direction of the drive shaft connection area offset to the shifting forks of the first group of shifting element actuators, the drive shaft mounted to the cover.

21. The transmission of claim 1, wherein further comprising an additional electric motor, the additional electric motor connected or connectable to the drive shaft.

22. The transmission of claim 1, further comprising an oil pump, the oil pump arranged adjacent to and axially along the drive shaft in the direction of the output shaft connection area offset to the main gear set and within the housing, the oil pump operatively connected to the output shaft such that the oil pump is drivable by the output shaft.

* * * * *